United States Patent
Jang (10) Patent No.: US 11,580,854 B2
(45) Date of Patent: Feb. 14, 2023

(54) BAD WEATHER JUDGMENT APPARATUS AND BAD WEATHER JUDGMENT METHOD THEREOF

(71) Applicants: HYUNDAI MOTOR COMPANY, Seoul (KR); KIA MOTORS CORPORATION, Seoul (KR)

(72) Inventor: Sung Moon Jang, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 327 days.

(21) Appl. No.: 16/863,607

(22) Filed: Apr. 30, 2020

(65) Prior Publication Data
US 2021/0264781 A1    Aug. 26, 2021

(30) Foreign Application Priority Data
Feb. 24, 2020   (KR) .......................... 10-2020-0022046

(51) Int. Cl.
| | |
|---|---|
| G08G 1/0967 | (2006.01) |
| G06K 9/62 | (2022.01) |
| G01S 13/95 | (2006.01) |
| G01W 1/10 | (2006.01) |

(52) U.S. Cl.
CPC ............ G08G 1/0967 (2013.01); G01S 13/95 (2013.01); G01W 1/10 (2013.01); G06K 9/6288 (2013.01)

(58) Field of Classification Search
None
See application file for complete search history.

(56) References Cited

U.S. PATENT DOCUMENTS

| | | | | |
|---|---|---|---|---|
| 6,232,882 B1 * | 5/2001 | Hed | ........................ | G01W 1/16 |
| | | | | 73/384 |
| 7,558,674 B1 * | 7/2009 | Neilley | .................... | G01W 1/02 |
| | | | | 702/3 |
| 10,605,912 B1 * | 3/2020 | Godfrey | ................ | G01S 13/953 |

(Continued)

FOREIGN PATENT DOCUMENTS

| | | | | |
|---|---|---|---|---|
| CA | 2829914 A1 * | 6/2014 | ........... | G01N 33/246 |
| CN | 108254750 A * | 7/2018 | ............. | G01S 13/95 |

(Continued)

*Primary Examiner* — Fekadeselassie Girma
(74) *Attorney, Agent, or Firm* — Morgan, Lewis & Bockius LLP (57) ABSTRACT

A bad weather judgment apparatus and a bad weather judgment method thereof are disclosed. The apparatus includes a target recognizer configured to recognize targets in detection areas of a plurality of heterogeneous sensors based on sensor recognition information received from the heterogeneous sensors, a counter configured to count the number of cases based on detection states of the heterogeneous sensors about a same target among the targets, and a bad weather judger configured to determine whether the same target is present in bad weather judgment zones of the detection areas of the heterogeneous sensors, control the counter to increment or decrement the number of the cases based on detection states of the heterogeneous sensors about whether the same target is present in the bad weather judgment zones, and judge current weather to be bad weather when the number of the cases is greater than a threshold value.

18 Claims, 8 Drawing Sheets

(56) References Cited

U.S. PATENT DOCUMENTS

| | | | | |
|---|---|---|---|---|
| 2009/0315762 A1* | 12/2009 | Venkatachalam | ....... | G01S 7/025 342/127 |
| 2011/0128144 A1* | 6/2011 | Baron, Sr. | .............. | G08B 21/18 340/539.3 |
| 2018/0047043 A1* | 2/2018 | Bharadwaj | ............. | G06Q 50/06 |
| 2018/0224859 A1* | 8/2018 | Brudner | .................. | G01W 1/02 |

FOREIGN PATENT DOCUMENTS

| | | | | | |
|---|---|---|---|---|---|
| CN | 108802733 | A | * | 11/2018 | |
| CN | 110119494 | A | * | 8/2019 | |
| KR | 20110070328 | A | * | 6/2011 | ............. G06F 3/038 |

\* cited by examiner

BAD WEATHER JUDGMENT APPARATUS AND BAD WEATHER JUDGMENT METHOD THEREOF

This application claims the benefit of Korean Patent Application No. 10-2020-0022046, filed on Feb. 24, 2020, which is hereby incorporated by reference as if fully set forth herein.

TECHNICAL FIELD

The present disclosure relates to a bad weather judgment apparatus for a vehicle, and more particularly, to a bad weather judgment apparatus which is capable of judging bad weather using heterogeneous sensor information and a bad weather judgment method thereof.

BACKGROUND

In general, an autonomous driving system may obtain more secure autonomous driving sensor information by fusing information of heterogeneous sensors to overcome the performance limitations of each sensor.

However, the sensor performance limitations still remain in spite of such an effort, and a representative thereof is degradation in sensor performance due to bad weather.

In bad weather, although more or less every sensor, detection distance/detection accuracy performance of each sensor may be degraded and the possibility of misrecognition or erroneous sensing of each sensor may be increased.

Because degradation in recognition performance of the autonomous driving system affects reliability of the autonomous driving system, it may be safer according to a given situation in bad weather that a driver personally drives a vehicle rather than that the autonomous driving system controls the vehicle.

Hence, the autonomous driving system should perceive and prepare for bad weather and let the driver recognize the bad weather by warning the driver of the limit situation of the autonomous driving system.

A camera, a radar and a lidar may be currently regarded as representative sensors taking charge of recognition in the autonomous driving system. However, such sensors cannot recognize degradation in performance thereof resulting from bad weather by themselves.

The reason is that each sensor cannot discriminate between a situation in which each sensor fails to recognize a target due to reduction in detection distance resulting from the bad weather and a situation in which a target is not actually present.

That is, because there may be non-detection/erroneous sensing in a single sensor irrespective of bad weather, it is difficult to judge degradation in performance (detection distance/detection accuracy performance) resulting from the bad weather by means of only the single sensor.

Accordingly, there is, in future, a need for development of a bad weather judgment apparatus which is capable of, during autonomous driving, accurately recognizing a bad weather situation and judging sensor performance degradation resulting from bad weather.

SUMMARY

Accordingly, the present disclosure is directed to a bad weather judgment apparatus and a bad weather judgment method thereof that substantially obviate one or more problems due to limitations and disadvantages of the related art.

An object of the present disclosure is to provide a bad weather judgment apparatus which is capable of judging bad weather by determining whether the same target is present in bad weather judgment zones of detection areas of heterogeneous sensors, so as to, during autonomous driving, accurately recognize a bad weather situation and judge sensor performance degradation resulting from the bad weather, and a bad weather judgment method thereof.

Another object of the present disclosure is to provide a bad weather judgment apparatus which is capable of judging degradation in performance of heterogeneous sensors using a performance difference among the heterogeneous sensors and judging bad weather based on a performance degradation difference among the sensors, thereby enabling an autonomous driving system to recognize the bad weather by itself and utilize the corresponding information for safety of a user, and a bad weather judgment method thereof.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the present disclosure, as embodied and broadly described herein, a bad weather judgment apparatus includes a target recognizer configured to recognize targets in detection areas of a plurality of heterogeneous sensors based on sensor recognition information received from the heterogeneous sensors, a counter configured to count the number of cases based on detection states of the heterogeneous sensors about a same target among the targets, and a bad weather judger configured to determine whether the same target is present in bad weather judgment zones of the detection areas of the heterogeneous sensors, control the counter to increment or decrement the number of the cases based on detection states of the heterogeneous sensors about whether the same target is present in the bad weather judgment zones, and judge current weather to be bad weather when the number of the cases is greater than a threshold value.

In another aspect of the present disclosure, a bad weather judgment method of a bad weather judgment apparatus, which includes a target recognizer, a counter, and a bad weather judger, includes recognizing, by the target recognizer, targets in detection areas of a plurality of heterogeneous sensors based on sensor recognition information received from the heterogeneous sensors, determining, by the bad weather judger, whether a same target among the targets is present in bad weather judgment zones of the detection areas of the heterogeneous sensors, incrementing or decrementing, by the counter, the number of cases based on detection states of the heterogeneous sensors about whether the same target is present in the bad weather judgment zones, determining, by the bad weather judger, whether the number of the cases is greater than a threshold value, and judging, by the bad weather judger, current weather to be bad weather when the number of the cases is greater than the threshold value.

In another aspect of the present disclosure, a computer-readable recording medium for storing a program for execution of a bad weather judgment method of a bad weather judgment apparatus executes processes included in the bad weather judgment method.

In another aspect of the present disclosure, a vehicle includes a plurality of heterogeneous sensors, and a bad weather judgment apparatus configured to judge bad weather by determining whether a same target is present in bad weather judgment zones of detection areas of the heterogeneous sensors, wherein the bad weather judgment apparatus includes a target recognizer configured to recognize targets in the detection areas based on sensor recognition information received from the heterogeneous sensors, a counter configured to count the number of cases based on detection states of the heterogeneous sensors about the same target, and a bad weather judger configured to determine whether the same target is present in the bad weather judgment zones of the detection areas of the heterogeneous sensors, control the counter to increment or decrement the number of the cases based on detection states of the heterogeneous sensors about whether the same target is present in the bad weather judgment zones, and judge current weather to be the bad weather when the number of the cases is greater than a threshold value.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. The following embodiments are given by way of example in order to enable those skilled in the art to fully understand the idea of the present disclosure. Therefore, the present disclosure is not limited by the following embodiments, and may be realized in various other forms. In order to clearly describe the present disclosure, parts having no relation to the description of the present disclosure have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

Hereinafter, a bad weather judgment apparatus and a bad weather judgment method thereof which may be applied to embodiments of the present disclosure will be described in detail with reference to FIGS. 1 to 9.

Figure 1:
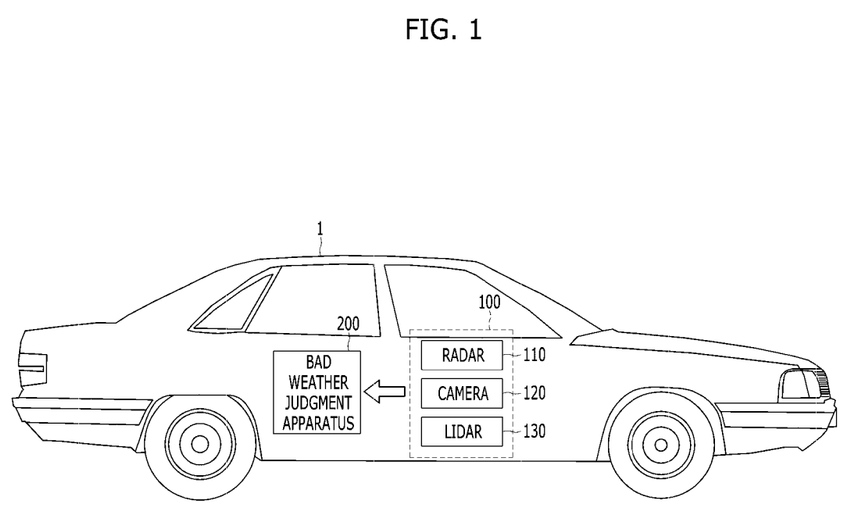
FIG. 1 is a view illustrating a vehicle including a bad weather judgment apparatus according to an embodiment of the present disclosure.

FIG. 1 is a view illustrating a vehicle including a bad weather judgment apparatus according to an embodiment of the present disclosure.

As shown in FIG. 1, the vehicle 1 of the present disclosure may include a plurality of heterogeneous sensors 100, and a bad weather judgment apparatus 200 configured to judge bad weather by determining whether the same target is present in bad weather judgment zones of detection areas of the heterogeneous sensors 100.

Here, the heterogeneous sensors 100 may include first, second and third sensors having different Fields Of View (FOVs) and different detection distances, but is not limited thereto.

For example, the heterogeneous sensors 100 may include a first sensor 110 which may be a radar, a second sensor 120 which may be a camera, and a third sensor 130 which may be a lidar.

The bad weather judgment apparatus 200 may recognize targets in the detection areas of the heterogeneous sensors 100 based on sensor recognition information received from the heterogeneous sensors 100, determine whether the same target is present in the bad weather judgment zones of the detection areas of the heterogeneous sensors 100, count up/down the number of cases based on detection states of the heterogeneous sensors 100 about whether the same target is present in the bad weather judgment zones, and judge the current weather to be the bad weather when the number of the cases is greater than a threshold value.

Here, the bad weather judgment apparatus 200 may recognize the targets in the detection areas based on first sensor recognition information received from the first sensor 110 among the heterogeneous sensors 100, second sensor recognition information received from the second sensor 120 among the heterogeneous sensors 100, third sensor recognition information received from the third sensor 130 among the heterogeneous sensors 100, and high-definition map information externally received.

In the process of determining whether the same target is present in the bad weather judgment zones, the bad weather judgment apparatus 200 may recognize the bad weather judgment zones respectively from the respective detection areas of the heterogeneous sensors 100 based on a preset bad weather judgment zone and determine whether the same target is present in the respectively recognized bad weather judgment zones.

Here, the bad weather judgment apparatus 200 may set a common detection area in which the detection areas of the heterogeneous sensors 100 overlap with one another to the bad weather judgment zone on the basis of a general weather environment.

Then, in the process of determining whether the same target is present in the bad weather judgment zones, the bad weather judgment apparatus 200 may determine whether a first target is present in a bad weather judgment zone of a first detection area of the first sensor 110 among the heterogeneous sensors 100, determine whether the first target is present in a bad weather judgment zone of a second detection area of the second sensor 120 among the heterogeneous sensors 100 when the first target is present in the bad weather judgment zone of the first detection area, and determine whether the first target is present in a bad weather judgment zone of a third detection area of the third sensor 130 among the heterogeneous sensors 100 when the first target is present in the bad weather judgment zone of the second detection area.

Next, in the process of counting up/down the number of the cases based on the detection states of the heterogeneous sensors 100 about whether the same target is present in the bad weather judgment zones, the bad weather judgment apparatus 200 may count down the number of first cases when the detection states of the heterogeneous sensors 100 indicate that the same target is present in all of a bad weather judgment zone of a radar detection area, a bad weather judgment zone of a camera detection area and a bad weather judgment zone of a lidar detection area.

In some cases, in the process of counting up/down the number of the cases based on the detection states of the heterogeneous sensors 100 about whether the same target is present in the bad weather judgment zones, the bad weather judgment apparatus 200 may count up the number of the first cases when the detection states of the heterogeneous sensors 100 indicate that the same target is present in both the bad weather judgment zone of the radar detection area and the bad weather judgment zone of the camera detection area and not in the bad weather judgment zone of the lidar detection area.

In another case, in the process of counting up/down the number of the cases based on the detection states of the heterogeneous sensors 100 about whether the same target is present in the bad weather judgment zones, the bad weather judgment apparatus 200 may count down the number of second cases when the detection states of the heterogeneous sensors 100 indicate that the same target is present in both the bad weather judgment zone of the radar detection area and the bad weather judgment zone of the lidar detection area and not in the bad weather judgment zone of the camera detection area.

In another case, in the process of counting up/down the number of the cases based on the detection states of the heterogeneous sensors 100 about whether the same target is present in the bad weather judgment zones, the bad weather judgment apparatus 200 may count up the number of the second cases when the detection states of the heterogeneous sensors 100 indicate that the same target is present in the bad weather judgment zone of the radar detection area and not in the bad weather judgment zone of the camera detection area and the bad weather judgment zone of the lidar detection area.

In addition, the bad weather judgment apparatus 200 may compare the number of the first cases with a first threshold value when the number of the cases is the number of the first cases, and judge the current weather to be the bad weather when the number of the first cases is greater than the first threshold value.

In addition, the bad weather judgment apparatus 200 may compare the number of the second cases with a second threshold value when the number of the cases is the number of the second cases, and judge the current weather to be the bad weather when the number of the second cases is greater than the second threshold value.

In this manner, the present disclosure may judge bad weather by determining whether the same target is present in bad weather judgment zones of detection areas of heterogeneous sensors, so as to, during autonomous driving, accurately recognize a bad weather situation and judge sensor performance degradation resulting from the bad weather.

Further, the present disclosure may judge degradation in performance of heterogeneous sensors using a performance difference among the heterogeneous sensors and judge bad weather based on a performance degradation difference among the sensors, thereby enabling an autonomous driving system to recognize the bad weather by itself and utilize the corresponding information for safety of a user.

In addition, according to the present disclosure, an autonomous driving system may recognize bad weather by itself and prepare for degradation in performance thereof by itself or request assistance of a driver, thereby increasing stability of the autonomous driving system.

For example, if a bad weather situation occurs during autonomous driving on the freeway, the autonomous driving system may reduce the risk of an accident in such a manner as to reduce the speed of a vehicle.

In addition, in the bad weather situation, the autonomous driving system may warn the driver of the bad weather situation and transfer control authority of the vehicle to the driver. In one example, the autonomous driving system or the bad weather judgment apparatus may output an alarm to warn the driver of the bad weather situation and/or output a message to inform the driver about transferring control authority of the vehicle from the autonomous driving system to the driver, in response to a determination of the bad weather situation.

Figure 2:
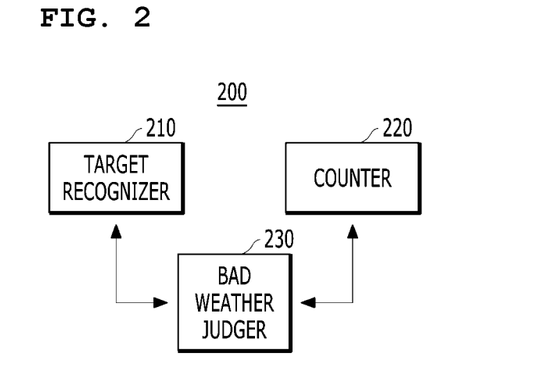
FIG. 2 is a block diagram illustrating a bad weather judgment apparatus according to an embodiment of the present disclosure.

FIG. 2 is a block diagram illustrating a bad weather judgment apparatus according to an embodiment of the present disclosure.

As shown in FIG. 2, the bad weather judgment apparatus 200 of the present disclosure may include a target recognizer 210, a counter 220, and a bad weather judger 230.

Here, the target recognizer 210 may recognize targets in detection areas of a plurality of heterogeneous sensors based on sensor recognition information received from the heterogeneous sensors.

For example, the target recognizer 210 may recognize the targets in the detection areas based on first sensor recognition information received from a first sensor among the heterogeneous sensors, second sensor recognition information received from a second sensor among the heterogeneous sensors, third sensor recognition information received from a third sensor among the heterogeneous sensors, and high-definition map information externally received.

Here, the first, second and third sensors may have different Fields Of View (FOVs) and different detection distances.

The first sensor may be a radar, the second sensor may be a camera, and the third sensor may be a lidar.

The counter 220 may count the number of cases based on detection states of the heterogeneous sensors about the same target.

The bad weather judger 230 may determine whether the same target is present in bad weather judgment zones of the detection areas of the heterogeneous sensors, control the counter 220 to increment/decrement the number of the cases based on detection states of the heterogeneous sensors about whether the same target is present in the bad weather judgment zones, and judge the current weather to be bad weather when the number of the cases is greater than a threshold value.

In the process of determining whether the same target is present in the bad weather judgment zones, the bad weather judger 230 may recognize the bad weather judgment zones respectively from the respective detection areas of the heterogeneous sensors based on a preset bad weather judgment zone and determine whether the same target is present in the respectively recognized bad weather judgment zones.

Here, the bad weather judger 230 may set a common detection area in which the detection areas of the heterogeneous sensors overlap with one another to the bad weather judgment zone on the basis of a general weather environment.

For example, the bad weather judger 230 may select, in the general weather environment, a common detection area in which a first detection area of the first sensor among the heterogeneous sensors, a second detection area of the second sensor thereamong and a third detection area of the third sensor thereamong overlap with one another, based on the first, second and third detection areas, and set the selected common detection area to the bad weather judgment zone.

Then, in the process of determining whether the same target is present in the bad weather judgment zones, the bad weather judger 230 may determine whether a first target is present in a bad weather judgment zone of the first detection area of the first sensor among the heterogeneous sensors, determine whether the first target is present in a bad weather judgment zone of the second detection area of the second sensor among the heterogeneous sensors when the first target is present in the bad weather judgment zone of the first detection area, and determine whether the first target is present in a bad weather judgment zone of the third detection area of the third sensor among the heterogeneous sensors when the first target is present in the bad weather judgment zone of the second detection area.

When the first target is not present in the process of determining whether the first target is present in the bad weather judgment zone of the first detection area of the first sensor, the bad weather judger 230 may repeat the process of determining whether the first target is present in the bad weather judgment zone of the first detection area of the first sensor among the heterogeneous sensors.

In addition, when the first target is not present in the process of determining whether the first target is present in the bad weather judgment zone of the second detection area of the second sensor, the bad weather judger 230 may determine whether the first target is present in the bad weather judgment zone of the third detection area of the third sensor among the heterogeneous sensors.

In addition, the bad weather judger 230 may control the counter 220 to increment/decrement the number of the cases according to whether the first target is present in the process of determining whether the first target is present in the bad weather judgment zone of the third detection area of the third sensor.

Here, the bad weather judger 230 may control the counter 220 to decrement the number of the cases when the first target is present, and may control the counter 220 to increment the number of the cases when the first target is not present.

Next, in the process of controlling the counter 220, the bad weather judger 230 may control the counter 220 to decrement the number of first cases when the detection states of the heterogeneous sensors indicate that the same target is present in all of a bad weather judgment zone of a radar detection area, a bad weather judgment zone of a camera detection area and a bad weather judgment zone of a lidar detection area.

For example, the first cases may include a condition that the same target is present simultaneously in the bad weather judgment zone of the radar detection area and the bad weather judgment zone of the camera detection area.

In addition, in the process of controlling the counter 220, the bad weather judger 230 may control the counter 220 to increment the number of the first cases when the detection states of the heterogeneous sensors indicate that the same target is present in both the bad weather judgment zone of the radar detection area and the bad weather judgment zone of the camera detection area and not in the bad weather judgment zone of the lidar detection area.

Here, the first cases may include the condition that the same target is present simultaneously in the bad weather judgment zone of the radar detection area and the bad weather judgment zone of the camera detection area.

Further, in the process of controlling the counter 220, the bad weather judger 230 may control the counter 220 to decrement the number of second cases when the detection states of the heterogeneous sensors indicate that the same target is present in both the bad weather judgment zone of the radar detection area and the bad weather judgment zone of the lidar detection area and not in the bad weather judgment zone of the camera detection area.

Here, the second cases may include a condition that the same target is present in the bad weather judgment zone of the radar detection area and not in the bad weather judgment zone of the camera detection area.

In addition, in the process of controlling the counter 220, the bad weather judger 230 may control the counter 220 to increment the number of the second cases when the detection states of the heterogeneous sensors indicate that the same target is present in the bad weather judgment zone of the radar detection area and not in the bad weather judgment zone of the camera detection area and the bad weather judgment zone of the lidar detection area.

Here, the second cases may include the condition that the same target is present in the bad weather judgment zone of the radar detection area and not in the bad weather judgment zone of the camera detection area.

On the other hand, when the number of the cases is smaller than or equal to the threshold value, the bad weather judger 230 may judge the current weather to be general weather.

In addition, the bad weather judger 230 may compare the number of the first cases with a first threshold value when the number of the cases is the number of the first cases, and judge the current weather to be the bad weather when the number of the first cases is greater than the first threshold value.

Here, the first cases may include the condition that the same target is present simultaneously in the bad weather judgment zone of the radar detection area and the bad weather judgment zone of the camera detection area.

Further, the bad weather judger 230 may compare the number of the second cases with a second threshold value when the number of the cases is the number of the second cases, and judge the current weather to be the bad weather when the number of the second cases is greater than the second threshold value.

Here, the second cases may include the condition that the same target is present in the bad weather judgment zone of the radar detection area and not in the bad weather judgment zone of the camera detection area.

For example, the first threshold value and the second threshold value may be different.

Here, the first threshold value and the second threshold value may be set based on sensitivity and performance of the heterogeneous sensors.

Figure 3:
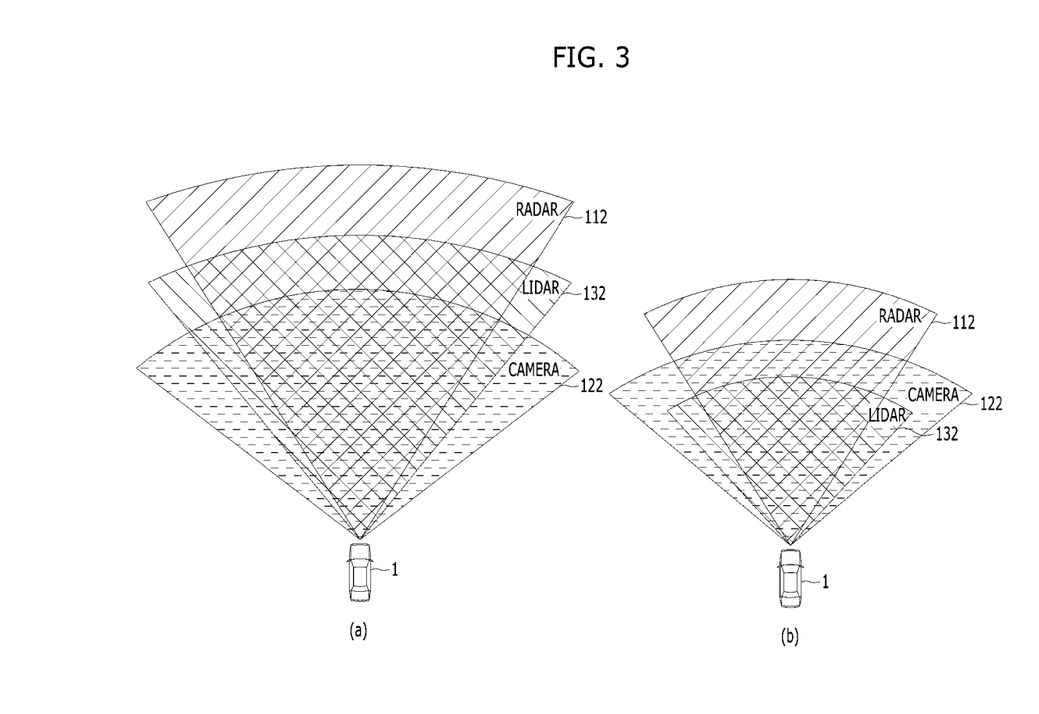
FIG. 3 shows views (a) and (b) illustrating differences in FOV and detection distance of heterogeneous sensors corresponding to whether the current weather is bad weather.

FIG. 3 shows views (a) (b) illustrating differences in FOV and detection distance of heterogeneous sensors corresponding to whether the current weather is bad weather.

View (a) in FIG. 3(a) illustrates FOVs and detection distances of heterogeneous sensors (camera/radar/lidar) of an autonomous driving system in a general weather environment.

As shown in view (a) in FIG. 3, the autonomous driving system may control the vehicle 1 based on the FOVs and detection distances of the heterogeneous sensors.

That is, in the general weather environment, a radar detection area 112, a camera detection area 122 and a lidar detection area 132 among detection areas of the heterogeneous sensors of the autonomous driving system may have different FOVs and different detection distances.

However, in the case where a bad weather situation occurs, detection accuracy of the heterogeneous sensors may be reduced due to signal attenuation and interference, resulting in reduction in actual FOV and detection distance of the heterogeneous sensors.

The reason is that heterogeneous sensors for autonomous driving are degraded in performance when a bad weather situation such as snow/rain/fog occurs during the autonomous driving.

View (b) in FIG. 3 illustrates FOVs and detection distances of heterogeneous sensors (camera/radar/lidar) of an autonomous driving system in a bad weather environment.

It can be seen from view in FIG. 3 that, in the bad weather environment, the radar detection area 112, the camera detection area 122 and the lidar detection area 132 among the detection areas of the heterogeneous sensors of the autonomous driving system have FOVs and detection distances reduced as compared with those in the general weather environment.

Here, in the bad weather environment, the heterogeneous sensors may all be reduced in FOV and detection distance, but may be different in performance degradation level.

The degradation levels of the heterogeneous sensors may be higher in the order of the lidar, camera and radar.

As a result, the detection distance of the lidar may be longer than that of the camera in the general weather environment as in view (a) in FIG. 3, but shorter than that of the camera in the bad weather environment as in view (b) in FIG. 3.

Figure 4:
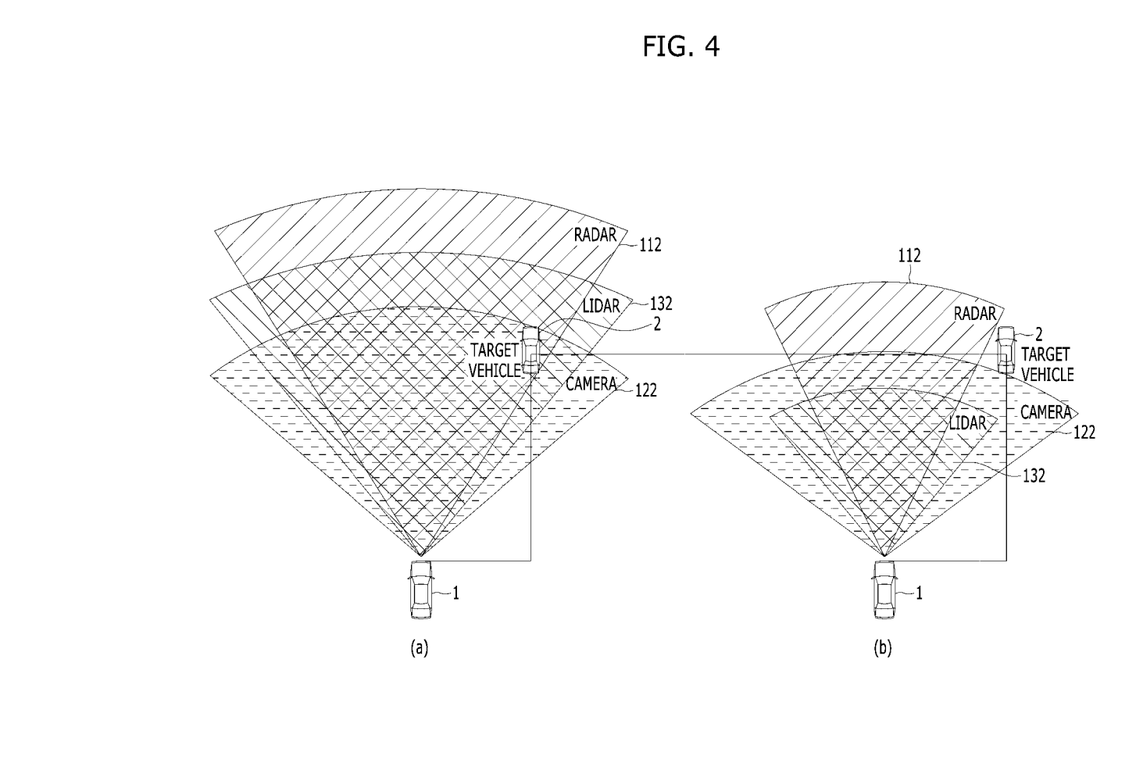
FIG. 4 shows views (a) and (b) illustrating differences in recognition of heterogeneous sensors on the same target, corresponding to whether the current weather is bad weather.

FIG. 4 shows views (a) and (b) illustrating differences in recognition of heterogeneous sensors on the same target, corresponding to whether the current weather is bad weather.

View (a) in FIG. 4 illustrates recognitions of heterogeneous sensors on the same target based on FOVs and detection distances in a general weather environment, and view (b) in FIG. 4 illustrates recognitions of heterogeneous sensors on the same target based on FOVs and detection distances in a bad weather environment.

As shown in view (a) in FIG. 4, in the general weather environment, not the bad weather environment, a target vehicle 2 at the same position can be recognized in all of the radar detection area 112, the camera detection area 122 and the lidar detection area 132.

However, as shown in view (b) in FIG. 4, in the bad weather environment, the target vehicle 2 at the same position cannot be recognized in all of the radar detection area 112, the camera detection area 122 and the lidar detection area 132 due to degradation in FOV and detection distance.

Because the autonomous driving system of the existing vehicle 1 cannot recognize a bad weather situation, it may have the problem of, in the bad weather situation, recognizing the target vehicle 2 as not being present even though the target vehicle 2 is actually present, as shown in view (b) in FIG. 4.

As a result, the autonomous driving system of the existing vehicle 1 may determine the target vehicle 2 not to be present even though the target vehicle 2 is actually present at a corresponding position, control the vehicle 1 according to a result of the determination, and thus erroneously determine whether lane change, acceleration/deceleration or left/right turn is possible.

Figure 5:
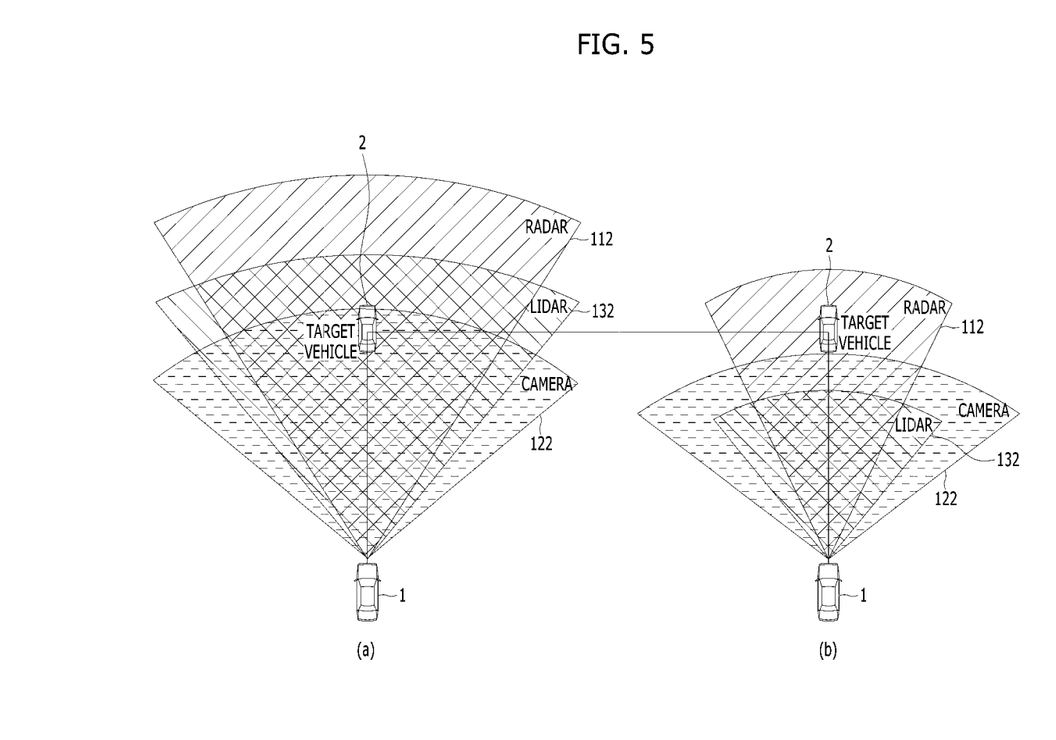
FIG. 5 shows views (a) and (b) illustrating differences in recognition of heterogeneous sensors on the same target, corresponding to whether the current weather is bad weather.

FIG. 5 shows views (a) and (b) illustrating differences in recognition of heterogeneous sensors on the same target, corresponding to whether the current weather is bad weather.

View (a) in FIG. 5 illustrates recognitions of heterogeneous sensors on the same target based on FOVs and detection distances in a general weather environment, and view (b) in FIG. 5 illustrates recognitions of heterogeneous sensors on the same target based on FOVs and detection distances in a bad weather environment.

As shown in view (a) in FIG. 5, in the general weather environment, not the bad weather environment, a target vehicle 2 at the same position can be recognized in all of the radar detection area 112, the camera detection area 122 and the lidar detection area 132.

However, as shown in view (b) in FIG. 5, in the bad weather environment, the target vehicle 2 at the same position cannot be recognized in the camera detection area 122 and the lidar detection area 132 due to degradation in FOV and detection distance and can be recognized in only the radar detection area 112.

Because the autonomous driving system of the existing vehicle 1 cannot recognize a bad weather situation, it may have the problem of, in the bad weather situation, recognizing the target vehicle 2 to be a false target of low reliability in that only the radar recognizes the target vehicle 2, as shown in view (b) in FIG. 5.

As a result, the autonomous driving system of the existing vehicle 1 may determine the target vehicle 2 to be a false target of low reliability even though the target vehicle 2 is actually present at a corresponding position, control the vehicle 1 according to a result of the determination, and thus erroneously determine whether lane change, acceleration/deceleration or left/right turn is possible.

The camera, the radar and the lidar may be regarded as representative sensors taking charge of recognition in the existing autonomous driving system. However, such sensors cannot recognize degradation in performance thereof resulting from bad weather by themselves.

The reason is that each sensor cannot discriminate between a situation in which each sensor fails to recognize a target due to reduction in detection distance resulting from the bad weather and a situation in which a target is not actually present.

As a result, in the existing autonomous driving system, by means of only a single sensor, it is possible to judge only blockage in which sensor performance is abruptly degraded and it is difficult to judge the bad weather.

Figure 6:
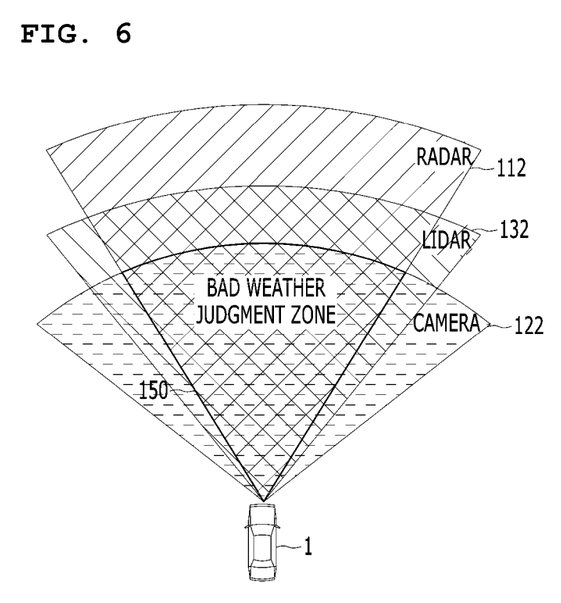
FIG. 6 is a view illustrating bad weather judgment zones of detection areas of heterogeneous sensors.
Figure 7:
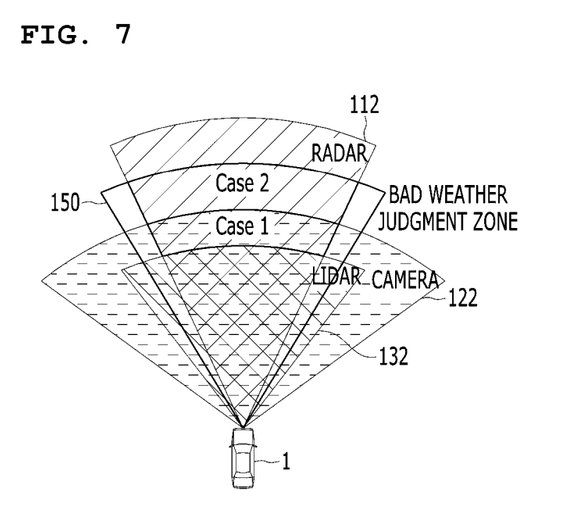
FIG. 7 is a view illustrating FOVs and detection distances of heterogeneous sensors and bad weather judgment zones in a bad weather environment.

FIG. 6 is a view illustrating bad weather judgment zones of detection areas of heterogeneous sensors according to the present disclosure, and FIG. 7 is a view illustrating FOVs and detection distances of heterogeneous sensors according to the present disclosure and bad weather judgment zones in a bad weather environment.

As shown in FIG. 6, the present disclosure may set a common detection area in which the detection areas of the heterogeneous sensors overlap with one another to a bad weather judgment zone 150 on the basis of a general weather environment.

For example, the present disclosure may select, in the general weather environment, a common detection area in which a radar detection area 112 of a radar sensor among the heterogeneous sensors, a camera detection area 122 of a camera sensor thereamong and a lidar detection area 132 of a lidar sensor thereamong overlap with one another, based on the radar detection area 112, the camera detection area 122 and the lidar detection area 132, and set the selected common detection area to the bad weather judgment zone 150.

As a result, the present disclosure may recognize bad weather judgment zones 150 respectively from the respective detection areas of the heterogeneous sensors based on the preset bad weather judgment zone 150 and determine whether the same target is present in the respectively recognized bad weather judgment zones 150.

It can be seen from FIG. 7 that, in the bad weather environment, the radar detection area 112, the camera detection area 122 and the lidar detection area 132 among the detection areas of the heterogeneous sensors of the autonomous driving system have FOVs and detection distances reduced as compared with those in the general weather environment.

Here, in the bad weather environment, the heterogeneous sensors may all be reduced in FOV and detection distance, but may be different in performance degradation level.

Accordingly, in the process of determining whether the same target is present in the bad weather judgment zones 150, the present disclosure may determine whether a target is present in the bad weather judgment zone 150 of the radar detection area 112 of the radar sensor among the heterogeneous sensors, determine whether the same target is present in the bad weather judgment zone 150 of the camera detection area 122 of the camera sensor among the heterogeneous sensors when the target is present in the bad weather judgment zone 150 of the radar detection area 112, and determine whether the same target is present in the bad weather judgment zone 150 of the lidar detection area 132 of the lidar sensor among the heterogeneous sensors when the same target is present in the bad weather judgment zone 150 of the camera detection area 122.

For example, in the case where the heterogeneous sensors are the radar, the camera and the lidar, a detection performance difference among the heterogeneous sensors may be generated as in the following table 1 in consideration of performance degradation resulting from the bad weather.

TABLE 1

|  | Radar | Camera | Lidar |
| --- | --- | --- | --- |
| First case | detection | detection | non-detection |
| Second case | detection | non-detection | non-detection |

As in FIG. 7, the bad weather judgment zone 150 set in the general weather situation may include areas corresponding to the first case and the second case due to the detection performance difference resulting from the bad weather.

Here, the first case is a case where a target in the bad weather judgment zone 150 is commonly detected simultaneously in the radar detection area 112 and the camera detection area 122 and is not detected in the lidar detection area 132.

The second case is a case where a target in the bad weather judgment zone 150 is detected in only the radar detection area 112 and not in the camera detection area 122 and the lidar detection area 132.

That is, the first case is a case where a target in the bad weather judgment zone 150 is detected by the radar and the camera, but not by the lidar, and the second case is a case where a target in the bad weather judgment zone 150 is detected by the radar, but not by the camera and the lidar.

Accordingly, the present disclosure may identify areas corresponding to the first case Case1 and the second case Case2 in the bad weather environment, and judge generation of a performance difference among the heterogeneous sensors by accumulating and counting the number of targets corresponding to the first case Case1 and the second case Case2.

In the general weather environment, because a target in the bad weather judgment zone 150 is within a common FOV/detection distance of the heterogeneous sensors, there is no phenomenon in which the target is detected by only a specific one of the heterogeneous sensors.

However, the present disclosure may judge the current weather to be bad weather when, at a distance corresponding to the bad weather judgment zone 150, the radar sensor detects a target and the camera/lidar sensor fails to detect the same target (second case).

The present disclosure may also judge the current weather to be bad weather when, at a distance corresponding to the bad weather judgment zone 150, the radar/camera sensor detects a target and the lidar sensor fails to detect the same target (first case).

The present disclosure may decrement the number of first cases when the detection states of the heterogeneous sensors indicate that the same target is present in all of the bad weather judgment zone of the radar detection area, the bad weather judgment zone of the camera detection area and the bad weather judgment zone of the lidar detection area.

In addition, the present disclosure may increment the number of the first cases when the detection states of the heterogeneous sensors indicate that the same target is present in both the bad weather judgment zone of the radar detection area and the bad weather judgment zone of the camera detection area and not in the bad weather judgment zone of the lidar detection area.

Further, the present disclosure may decrement the number of second cases when the detection states of the heterogeneous sensors indicate that the same target is present in both the bad weather judgment zone of the radar detection area and the bad weather judgment zone of the lidar detection area and not in the bad weather judgment zone of the camera detection area.

In addition, the present disclosure may increment the number of the second cases when the detection states of the heterogeneous sensors indicate that the same target is present in the bad weather judgment zone of the radar detection area and not in the bad weather judgment zone of the camera detection area and the bad weather judgment zone of the lidar detection area.

Further, the present disclosure may compare the number of the first cases with a first threshold value, and judge the current weather to be bad weather when the number of the first cases is greater than the first threshold value.

In addition, the present disclosure may compare the number of the second cases with a second threshold value, and judge the current weather to be the bad weather when the number of the second cases is greater than the second threshold value.

Figure 8:
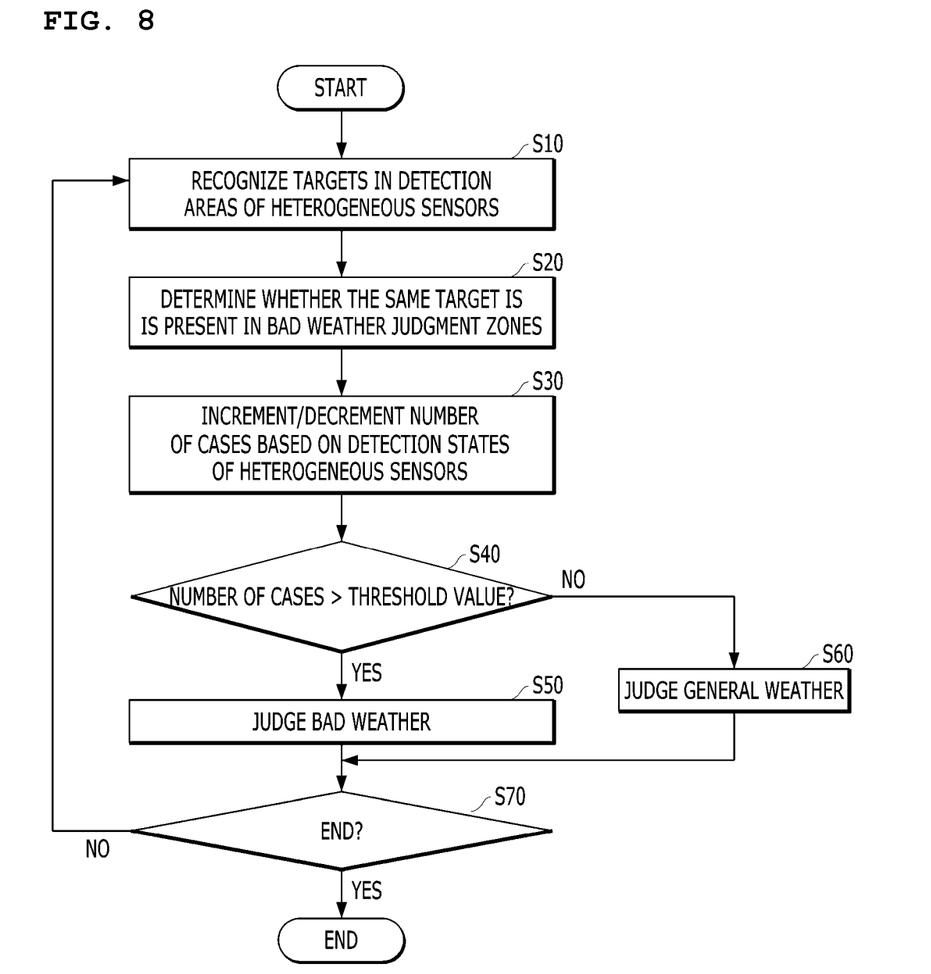
FIGS. 8 and 9 are flowcharts illustrating a bad weather judgment method of a bad weather judgment apparatus according to an embodiment of the present disclosure.
Figure 9:
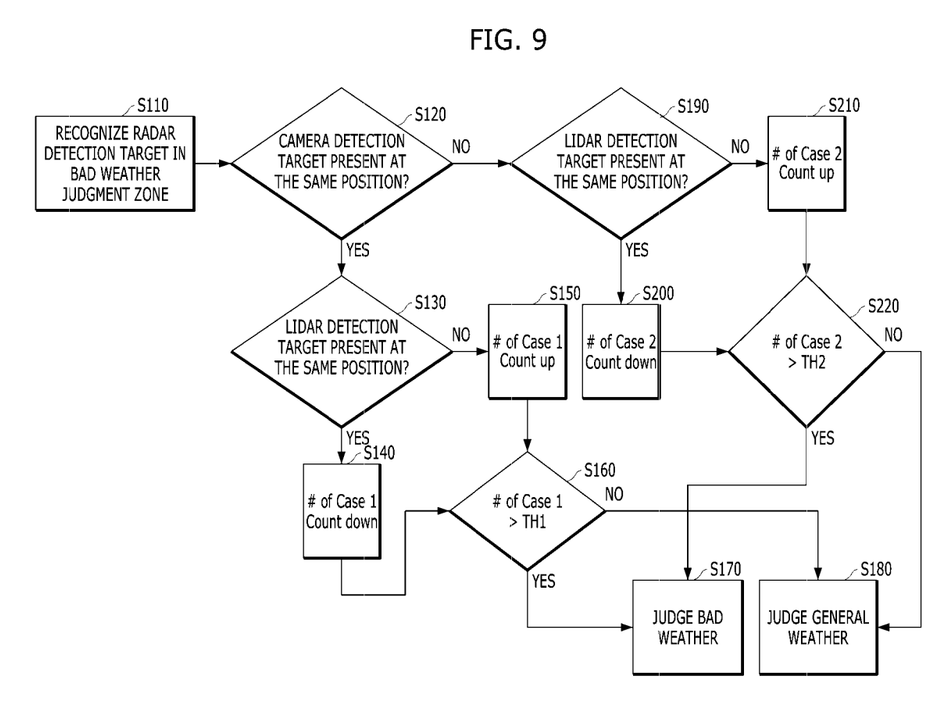

FIGS. 8 and 9 are flowcharts illustrating a bad weather judgment method of a bad weather judgment apparatus according to an embodiment of the present disclosure.

As shown in FIG. 8, the present invention may recognize targets in detection areas of a plurality of heterogeneous sensors based on sensor recognition information received from the heterogeneous sensors (S10).

Here, the present disclosure may recognize the targets in the detection areas based on radar sensor recognition information received from a radar sensor among the heterogeneous sensors, camera sensor recognition information received from a camera sensor among the heterogeneous sensors, lidar sensor recognition information received from a lidar sensor among the heterogeneous sensors and high-definition map information externally received.

Then, the present disclosure may determine whether the same target is present in bad weather judgment zones of the detection areas of the heterogeneous sensors (S20).

Here, the present disclosure may recognize the bad weather judgment zones respectively from the respective detection areas of the heterogeneous sensors based on a preset bad weather judgment zone and determine whether the same target is present in the respectively recognized bad weather judgment zones.

For example, the present disclosure may determine whether a first target is present in a bad weather judgment zone of a radar detection area of the radar sensor among the heterogeneous sensors, determine whether the first target is present in a bad weather judgment zone of a camera detection area of the camera sensor among the heterogeneous sensors when the first target is present in the bad weather judgment zone of the radar detection area, and determine whether the first target is present in a bad weather judgment zone of a lidar detection area of the lidar sensor among the heterogeneous sensors when the first target is present in the bad weather judgment zone of the camera detection area.

Then, the present disclosure may increment/decrement the number of cases based on detection states of the heterogeneous sensors about whether the same target is present in the bad weather judgment zones (S30).

Here, the present disclosure may decrement the number of first cases when the detection states of the heterogeneous sensors indicate that the same target is present in all of the bad weather judgment zone of the radar detection area, the bad weather judgment zone of the camera detection area and the bad weather judgment zone of the lidar detection area.

In some cases, the present disclosure may increment the number of the first cases when the detection states of the heterogeneous sensors indicate that the same target is present in both the bad weather judgment zone of the radar detection area and the bad weather judgment zone of the camera detection area and not in the bad weather judgment zone of the lidar detection area.

In another case, the present disclosure may decrement the number of second cases when the detection states of the heterogeneous sensors indicate that the same target is present in both the bad weather judgment zone of the radar detection area and the bad weather judgment zone of the lidar detection area and not in the bad weather judgment zone of the camera detection area.

In another case, the present disclosure may increment the number of the second cases when the detection states of the heterogeneous sensors indicate that the same target is present in the bad weather judgment zone of the radar detection area and not in the bad weather judgment zone of the camera detection area and the bad weather judgment zone of the lidar detection area.

Here, the first cases may include a condition that the same target is present simultaneously in the bad weather judgment zone of the radar detection area and the bad weather judgment zone of the camera detection area, and the second cases may include a condition that the same target is present in the bad weather judgment zone of the radar detection area and not in the bad weather judgment zone of the camera detection area.

Next, the present disclosure may determine whether the number of the cases is greater than a threshold value (S40).

Here, the present disclosure may compare the number of the first cases with a first threshold value when the number of the cases is the number of the first cases, and may compare the number of the second cases with a second threshold value when the number of the cases is the number of the second cases.

For example, the first threshold value and the second threshold value may be different and be set based on sensitivity and performance of the heterogeneous sensors.

Then, the present disclosure may judge the current weather to be bad weather when the number of the cases is greater than the threshold value (S50).

Here, the present disclosure may judge the current weather to be the bad weather when the number of the first cases is greater than the first threshold value, and may judge the current weather to be the bad weather when the number of the second cases is greater than the second threshold value.

On the other hand, when the number of the cases is smaller than or equal to the threshold value, the present disclosure may judge the current weather to be general weather (S60).

Next, the present disclosure may determine whether the current state is a bad weather judgment end state (S70), and end the bad weather judgment process upon determining that the current state is the bad weather judgment end state.

Hereinafter, the bad weather judgment process of the present disclosure will be described in more detail with reference to FIG. 9.

As shown in FIG. 9, upon recognizing a target in the bad weather judgment zone of the radar detection area (S110), the present disclosure may determine whether the same target is present in the bad weather judgment zone of the camera detection area (S120).

Then, the present disclosure may determine whether the same target is present in the bad weather judgment zone of the lidar detection area when the same target is present in the bad weather judgment zone of the camera detection area (S130).

Then, the present disclosure may decrement the number of the first cases when the same target is present in the bad weather judgment zone of the lidar detection area (S140).

On the other hand, the present disclosure may increment the number of the first cases when the same target is not present in the bad weather judgment zone of the lidar detection area (S150).

Next, the present disclosure may determine whether the number of the first cases is greater than the first threshold value (S160).

The present disclosure may judge the current weather to be the bad weather when the number of the first cases is greater than the first threshold value (S170), and may judge the current weather to be the general weather when the number of the first cases is smaller than or equal to the first threshold value (S180).

On the other hand, when the same target is not present in the bad weather judgment zone of the camera detection area at the above step S120 of determining whether the same target is present in the bad weather judgment zone of the camera detection area, the present disclosure may determine whether the same target is present in the bad weather judgment zone of the lidar detection area (S190).

Then, the present disclosure may decrement the number of the second cases when the same target is present in the bad weather judgment zone of the lidar detection area (S200).

On the other hand, the present disclosure may increment the number of the second cases when the same target is not present in the bad weather judgment zone of the lidar detection area (S210).

Next, the present disclosure may determine whether the number of the second cases is greater than the second threshold value (S220).

The present disclosure may judge the current weather to be the bad weather when the number of the second cases is greater than the second threshold value (S170), and may judge the current weather to be the general weather when the number of the second cases is smaller than or equal to the second threshold value (S180).

Here, the first cases may include a condition that the same target is present simultaneously in the bad weather judgment zone of the radar detection area and the bad weather judgment zone of the camera detection area, and the second cases may include a condition that the same target is present in the bad weather judgment zone of the radar detection area and not in the bad weather judgment zone of the camera detection area.

For example, the first threshold value and the second threshold value may be different and be set based on sensitivity and performance of the heterogeneous sensors.

On the other hand, the present disclosure may provide a computer-readable recording medium for storing a program for execution of the bad weather judgment method of the bad weather judgment apparatus, which may execute the processes included in the bad weather judgment method.

As described above, the present disclosure may judge bad weather by determining whether the same target is present in bad weather judgment zones of detection areas of heterogeneous sensors, so as to, during autonomous driving, accurately recognize a bad weather situation and judge sensor performance degradation resulting from the bad weather.

Further, the present disclosure may judge degradation in performance of heterogeneous sensors using a performance difference among the heterogeneous sensors and judge bad weather based on a performance degradation difference among the sensors, thereby enabling an autonomous driving system to recognize the bad weather by itself and utilize the corresponding information for safety of a user.

In addition, according to the present disclosure, an autonomous driving system may recognize bad weather by itself and prepare for degradation in performance thereof by itself or request assistance of a driver, thereby increasing stability of the autonomous driving system.

For example, if a bad weather situation occurs during autonomous driving on the freeway, the autonomous driving system may reduce the risk of an accident in such a manner as to reduce the speed of a vehicle.

In addition, in the bad weather situation, the autonomous driving system may warn the driver of the bad weather situation and transfer control authority of the vehicle to the driver. In one example, the autonomous driving system or the bad weather judgment apparatus may output an alarm to warn the driver of the bad weather situation and/or output a message to inform the driver about transferring control authority of the vehicle from the autonomous driving system to the driver, in response to a determination of the bad weather situation.

The above-described bad weather judgment method of the present disclosure may be implemented as computer-readable code on the program storage medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device. In one example, the computer-readable medium may be a non-transitory computer-readable medium.

The aforementioned bad weather judgment apparatus and components thereof including the target recognizer, the counter, and the bad weather judger may be implemented as a computer, one or more processors/microprocessors, or a circuit, and the computer-readable medium storing computer readable code/algorithm/software. In one example, the bad weather judgment apparatus and the components thereof including the target recognizer, the counter, and the bad weather judger may include a computer, one or more processors/microprocessors, or a circuit, and the computer-readable medium storing computer readable code/algorithm/software. Such a computer, processor(s)/microprocessor(s), or a circuit may perform the above described functions, operations, steps, etc., by executing the computer readable code/algorithm/software stored on the computer readable recording medium.

As is apparent from the above description, in a bad weather judgment apparatus and a bad weather judgment method thereof according to at least one embodiment of the present disclosure, it may be possible to judge bad weather by determining whether the same target is present in bad weather judgment zones of detection areas of heterogeneous sensors, so as to, during autonomous driving, accurately recognize a bad weather situation and judge sensor performance degradation resulting from the bad weather.

Further, it may be possible to judge degradation in performance of heterogeneous sensors using a performance difference among the heterogeneous sensors and judge bad weather based on a performance degradation difference among the sensors, thereby enabling an autonomous driving system to recognize the bad weather by itself and utilize the corresponding information for safety of a user.

In addition, an autonomous driving system may recognize bad weather by itself and prepare for degradation in performance thereof by itself or request assistance of a driver, thereby increasing stability of the autonomous driving system.

For example, if a bad weather situation occurs during autonomous driving on the freeway, the autonomous driving system may reduce the risk of an accident in such a manner as to reduce the speed of a vehicle.

In addition, in the bad weather situation, the autonomous driving system may warn the driver of the bad weather situation and transfer control authority of the vehicle to the driver.

It will be appreciated by those skilled in the art that the effects achievable through the present disclosure are not limited to those that have been particularly described hereinabove and that other effects of the present disclosure will be more clearly understood from the above detailed description.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as included in the following claims.

What is claimed is:

1. A bad weather judgment apparatus comprising:
a target recognizer configured to recognize targets in detection areas of a plurality of heterogeneous sensors based on sensor recognition information received from the heterogeneous sensors;
a counter configured to count the number of cases based on detection states of the heterogeneous sensors about a same target, which is a target at a same position, among the targets; and
a bad weather judger configured to determine whether the same target is present in bad weather judgment zones of the detection areas of the heterogeneous sensors, control the counter to increment or decrement the number of the cases based on detection states of the heterogeneous sensors about whether the same target is present in the bad weather judgment zones, and judge current weather to be bad weather when the number of the cases is greater than a threshold value, and
wherein the target recognizer recognizes the targets in the detection areas based on first sensor recognition information received from a first sensor among the heterogeneous sensors, second sensor recognition information received from a second sensor among the heterogeneous sensors, third sensor recognition information received from a third sensor among the heterogeneous sensors and high-definition map information externally received.

2. The bad weather judgment apparatus according to claim 1, wherein, in determining whether the same target is present in the bad weather judgment zones, the bad weather judger recognizes the bad weather judgment zones respectively from the respective detection areas of the heterogeneous sensors based on a preset bad weather judgment zone and determines whether the same target is present in the respectively recognized bad weather judgment zones.

3. The bad weather judgment apparatus according to claim 1, wherein, in determining whether the same target is present in the bad weather judgment zones, the bad weather judger determines whether a first target is present in a bad weather judgment zone of a first detection area of the first sensor among the heterogeneous sensors, determines whether the first target is present in a bad weather judgment zone of a second detection area of the second sensor among the heterogeneous sensors when the first target is present in the bad weather judgment zone of the first detection area, and determines whether the first target is present in a bad weather judgment zone of a third detection area of the third sensor among the heterogeneous sensors when the first target is present in the bad weather judgment zone of the second detection area.

4. The bad weather judgment apparatus according to claim 1, wherein, in controlling the counter, the bad weather judger controls the counter to decrement the number of first cases when the detection states of the heterogeneous sensors indicate that the same target is present in all of a bad weather judgment zone of a radar detection area, a bad weather judgment zone of a camera detection area and a bad weather judgment zone of a lidar detection area.

5. The bad weather judgment apparatus according to claim 1, wherein, in controlling the counter, the bad weather judger controls the counter to increment the number of first cases when the detection states of the heterogeneous sensors indicate that the same target is present in both a bad weather judgment zone of a radar detection area and a bad weather judgment zone of a camera detection area and not in a bad weather judgment zone of a lidar detection area.

6. The bad weather judgment apparatus according to claim 1, wherein, in controlling the counter, the bad weather judger controls the counter to decrement the number of second cases when the detection states of the heterogeneous sensors indicate that the same target is present in both a bad weather judgment zone of a radar detection area and a bad weather judgment zone of a lidar detection area and not in a bad weather judgment zone of a camera detection area.

7. The bad weather judgment apparatus according to claim 1, wherein, in controlling the counter, the bad weather judger controls the counter to increment the number of second cases when the detection states of the heterogeneous sensors indicate that the same target is present in a bad weather judgment zone of a radar detection area and not in a bad weather judgment zone of a camera detection area and a bad weather judgment zone of a lidar detection area.

8. The bad weather judgment apparatus according to claim 1, wherein the bad weather judger compares the number of first cases with a first threshold value when the number of the cases is the number of the first cases, and judges the current weather to be the bad weather when the number of the first cases is greater than the first threshold value, and
the bad weather judger compares the number of second cases with a second threshold value when the number of the cases is the number of the second cases, and judges the current weather to be the bad weather when the number of the second cases is greater than the second threshold value.

9. A bad weather judgment method of a bad weather judgment apparatus, the bad weather judgment apparatus comprising a target recognizer, a counter, and a bad weather judger, the method comprising:
recognizing, by the target recognizer, targets in detection areas of a plurality of heterogeneous sensors based on sensor recognition information received from the heterogeneous sensors;
determining, by the bad weather judger, whether a same target, which is a target at a same position, among the targets is present in bad weather judgment zones of the detection areas of the heterogeneous sensors;
incrementing or decrementing, by the counter, the number of cases based on detection states of the heterogeneous sensors about whether the same target is present in the bad weather judgment zones;
determining, by the bad weather judger, whether the number of the cases is greater than a threshold value; and judging, by the bad weather judger, current weather to be bad weather when the number of the cases is greater than the threshold value, and wherein the recognizing targets in detection areas of a plurality of heterogeneous sensors based on sensor recognition information comprises recognizing the targets in the detection areas based on first sensor recognition information received from a first sensor among the heterogeneous sensors, second sensor recognition information received from a second sensor among the heterogeneous sensors, third sensor recognition information received from a third sensor among the heterogeneous sensors and high-definition map information externally received.

10. The bad weather judgment method according to claim 9, wherein the determining whether the same target is present in bad weather judgment zones comprises recognizing the bad weather judgment zones respectively from the respective detection areas of the heterogeneous sensors based on a preset bad weather judgment zone and determining whether the same target is present in the respectively recognized bad weather judgment zones.

11. The bad weather judgment method according to claim 9, wherein the determining whether the same target is present in bad weather judgment zones comprises determining whether a first target is present in a bad weather judgment zone of a first detection area of the first sensor among the heterogeneous sensors, determining whether the first target is present in a bad weather judgment zone of a second detection area of the second sensor among the heterogeneous sensors when the first target is present in the bad weather judgment zone of the first detection area, and determining whether the first target is present in a bad weather judgment zone of a third detection area of the third sensor among the heterogeneous sensors when the first target is present in the bad weather judgment zone of the second detection area.

12. The bad weather judgment method according to claim 9, wherein the incrementing or decrementing the number of cases comprises decrementing the number of first cases when the detection states of the heterogeneous sensors indicate that the same target is present in all of a bad weather judgment zone of a radar detection area, a bad weather judgment zone of a camera detection area and a bad weather judgment zone of a lidar detection area.

13. The bad weather judgment method according to claim 9, wherein the incrementing or decrementing the number of cases comprises incrementing the number of first cases when the detection states of the heterogeneous sensors indicate that the same target is present in both a bad weather judgment zone of a radar detection area and a bad weather judgment zone of a camera detection area and not in a bad weather judgment zone of a lidar detection area.

14. The bad weather judgment method according to claim 9, wherein the incrementing or decrementing the number of cases comprises decrementing the number of second cases when the detection states of the heterogeneous sensors indicate that the same target is present in both a bad weather judgment zone of a radar detection area and a bad weather judgment zone of a lidar detection area and not in a bad weather judgment zone of a camera detection area.

15. The bad weather judgment method according to claim 9, wherein the incrementing or decrementing the number of cases comprises incrementing the number of second cases when the detection states of the heterogeneous sensors indicate that the same target is present in a bad weather judgment zone of a radar detection area and not in a bad weather judgment zone of a camera detection area and a bad weather judgment zone of a lidar detection area.

16. The bad weather judgment method according to claim 9, wherein the judging current weather to be bad weather comprises:

comparing the number of first cases with a first threshold value when the number of the cases is the number of the first cases, and judging the current weather to be the bad weather when the number of the first cases is greater than the first threshold value, and comparing the number of second cases with a second threshold value when the number of the cases is the number of the second cases, and judging the current weather to be the bad weather when the number of the second cases is greater than the second threshold value.

17. A non-transitory computer-readable recording medium for storing a program which, when executed by a processor, causes the processor to perform the method according to claim 9.

18. A vehicle comprising:

heterogeneous sensors; and a bad weather judgment apparatus configured to judge bad weather by determining whether a same target, which is a target at a same position, is present in bad weather judgment zones of detection areas of the heterogeneous sensors, wherein the bad weather judgment apparatus comprises:

a target recognizer configured to recognize targets in the detection areas based on sensor recognition information received from the heterogeneous sensors;

a counter configured to count the number of cases based on detection states of the heterogeneous sensors about the same target; and a bad weather judger configured to determine whether the same target is present in the bad weather judgment zones of the detection areas of the heterogeneous sensors, control the counter to increment or decrement the number of the cases based on detection states of the heterogeneous sensors about whether the same target is present in the bad weather judgment zones, and judge current weather to be the bad weather when the number of the cases is greater than a threshold value, and wherein the target recognizer recognizes the targets in the detection areas based on first sensor recognition information received from a first sensor among the heterogeneous sensors, second sensor recognition information received from a second sensor among the heterogeneous sensors, third sensor recognition information received from a third sensor among the heterogeneous sensors and high-definition map information externally received.

* * * * *